(12) United States Patent
McCreight et al.

(10) Patent No.: X9358
(45) Date of Patent: Feb. 5, 1836

(54) GIN, COTTON

(76) Inventors: William McCreight; James McCreight

William Mc Creight and James Mc Creight
Letters Patent

The schedule referred to in these Letters Patent and making part of the same con-
taining a description in the words of the said William Mc Creight and James Mc
Creight themselves of their improvement in the saw Gin for picking cotton

---

To all to whom these presents shall come Be it known that we William Mc
Creight and James Mc Creight of the Town of Winnsborough Fairfield dis-
trict State of So Carolina have invented certain new and useful improve-
ments in the cotton saw gin & that the following is a full & exact description of the con-
struction & operation of the said machine as improved by us The general appearance
& operation of the machine as improved by us are not different from the old mode of con-
structing them but our improvements consist in affording great facilities in
keeping them in order whilst in operation & in keeping them in repair at compar-
atively no cost or trouble. We claim as our improvements first a moveable breast
second sliding ribs & third the centers of the brush & the pivots on which they turn.
The breast is hung to the front of the gin with two hinges & can always be raised so as to
get at the saws & relieve them when choked with very little labour & without any
risk of injuring the saws In the former mode of having a stationary breast when
the saws were choaked, the whole top of the gin head had to be moved & in replac-
ing it the saws were liable to injury & the operation of cleaning the saws was attended
with much more delay than by this mode. The sliding ribs are fastened in the
way now used to fasten them in the gin head, upon two transverse pieces cal-
led slat bearers which are inserted into long mortises on each side of the gin
head & confined there by screws which may at any time when the slats or ribs
are worn at one place be taken out so as to permit the slat bearers to be let
down in the mortises which are graduated so as to give the proper distance
& to keep the slat bearers level. the distance which we have used as the prop-
er one for each remove of the slat bearers has been 3/8 in of an inch. The slats
or ribs can in this mode be removed 4 or 5 times & each remove renders the slats
as good as a new set of slats by the old mode of having them stationary when
they were worn so as to let false seed & trash thro' them they had to be all
taken taken out and laid by a Mechanic; by our improvement the hand who attends to the gin can remove them & remedy the inconvenience of their having worn too much. The points by our improved mode are made of cast steel about four inches long & 5/8 of an inch square pointed at each end that when one point is worn the other may be used They are laid & indented in a piece of cast metal & confined with an iron clamp screw & tap. The centres are fixed in a cast metal ring which is fitted on the end of the brush cylinder & secured there with three wood screws there being a round hole in the middle of the ring to receive the centre which is fitted into it similar to the stopper of a decanter when worn it can be taken out and another inserted without altering the size of the brush. The three above described improvements we claim as our invention being calculated to make the cotton saw gin much more durable & more easily kept in order at a much less expense Witnesses
John B. McCall
Scott Cathcart Wm. McCreight
Jas. McCreight

E. L
C.A.W.

James Mc Creight
Letters Patent

The schedule referred to in these Letters Patent, and making part of the same containing a description in the words of the said James Mc Creight, him self of his improvements in the Reversed Cotton Gin

---

To all whom it may concern

Be it known that I James Mc Creight of the town of Winnsborough District of Fairfield in the state of South Carolina have invented certain new and useful improvements in the "Non Saw Gin Called Mc Creights Reversed Cotton Gin" which are described as follows, reference being had to the annexed drawings of the same making part of this specification. The frame of the reversed gin consists of two sills (marked A in the annexed drawings) 2 feet 9 inches long of scantling 6 inches by 4 placed on their edge with a mortise through the centre of each to receive two main posts marked B four feet 3 inches long of scantling 6 inches by 4, with a mortise one foot above the top of the sills to receive a rail the length of the frame of scantling 6 inches by 4 mark'd C. tenoned at the top to receive a cap marked D. of scantling 6 inches by three. The rail & cap are mortised to receive the [illegible] marked E The posts to carry the brush are mark'd O. and let into the sills at one end two inches in rear of the main posts and a screw bolt at the other end. The posts are 2 feet 4 inches above the sills of scantling 4 by 4 inches. The planks at the ends of the brush mark'd G. forms a box around the brush, and for the feeding breast to rest on. The hopper board is composed of two pieces of 1½ inch plank worked out to the segment of a circle the lower edge fitted on the slats the upper edge having wires inserted into it about one inch apart. The narrow piece of the hopper board is let down on the wires until it comes within 3 inches of the other piece both being made fast. The comb is made of sheet iron or steel 3½ inches broad with notches opposite the wires, fastened on a board and standing nearly perpendicular working on an iron pin with a screw below to put the comb to or from the roll. I the funnel turning on hinges. J. moveable boards to which the slats are fastened. K. saw L. brush. M. regulating screws and boxes of the brush. N.

N. pulleys and board. P. hopper board. Q. [illegible] to set in the hopper board.
R. Slats. S. comb. T. board, to which the comb is fastened. U. iron pins on
which the comb turns. V. screws to set the comb. W. driving pulley.
The frame funnel, saws, brush & gearing, are made in the usual manner.
The machine is driven by horse, steam or other power. The improvements
which I have made and desire to secure by Letters Patent consist principally,
in giving a direction to the rotation of the saws contrary to that of the common
gin, that is the saws turn towards the feed board instead of from it.
The advantages derived from this and the other improvements are 1. The great portion of
the motes false seed, sand and trash being thus discharged before the picked
cotton reaches the current of air about the brush. the picked cotton consequently
passes cleaner from the gin; while on the other hand in the common gin a great
portion of sand, motes, false seed, and trash having to pass directly through the
current of air when the picked cotton is floating mixes with it and in consequence
thereof a part of the cotton either sinks down with the trash or the trash rises and
passes with the cotton through the funnel. 2. The seed are discharged as soon
as picked, while in the common gin the seed has to pass round to where the seed
cotton is put in, and some seed is always covered that ought to be discharged. By which
means the seed is apt to be dropped in an irregular manner. 3 The weight of a large
roll of cotton lies directly on the saws which roll cannot be broken by over feeding
or a sudden jerk of the cog wheel while in the common gin the roll being more
[illegible] the saws is raised up and falls forward causing it to become hollow
and over feeding or a sudden jerk of the cog wheel breaks and often throws it out.
4. The picking in this machine being done on the descent of the ribs any hard sub-
stance finding its way to the saws cannot remain there nor injure the teeth.
while in the common gin the hard substance separates from the roll and
lodging against the saws often destroys a number of the teeth and sometimes
the saws altogether are destroyed. 5. The hopper or finger board in the reversed gin
is fixed and stationary having a rack and comb behind it which by pressing against
the roll when the gin is in motion brings off the seed freely and with great regular-
ity. while in the common gin the feed board being moveable either lets the seed
out with too much cotton on it or by retaining the seed too long the cotton is
slowly ginned. thus occasioning a loss of cotton or a loss of time. 6. The sand,
false false seed, motes, much leaf and other trash pass out with the seed and no
good cotton is lost in any way: while in the common gin much cotton is
wasted and lost and comparatively imperfectly cleaned from the causes before
stated, which causes are entirely removed: by the improvements now made
in the cotton gin Witnesses
James Cathcart
W. A. McCreight Jas. McCreight Drawing

[illegible]
A.J.W.

1020[illegible]

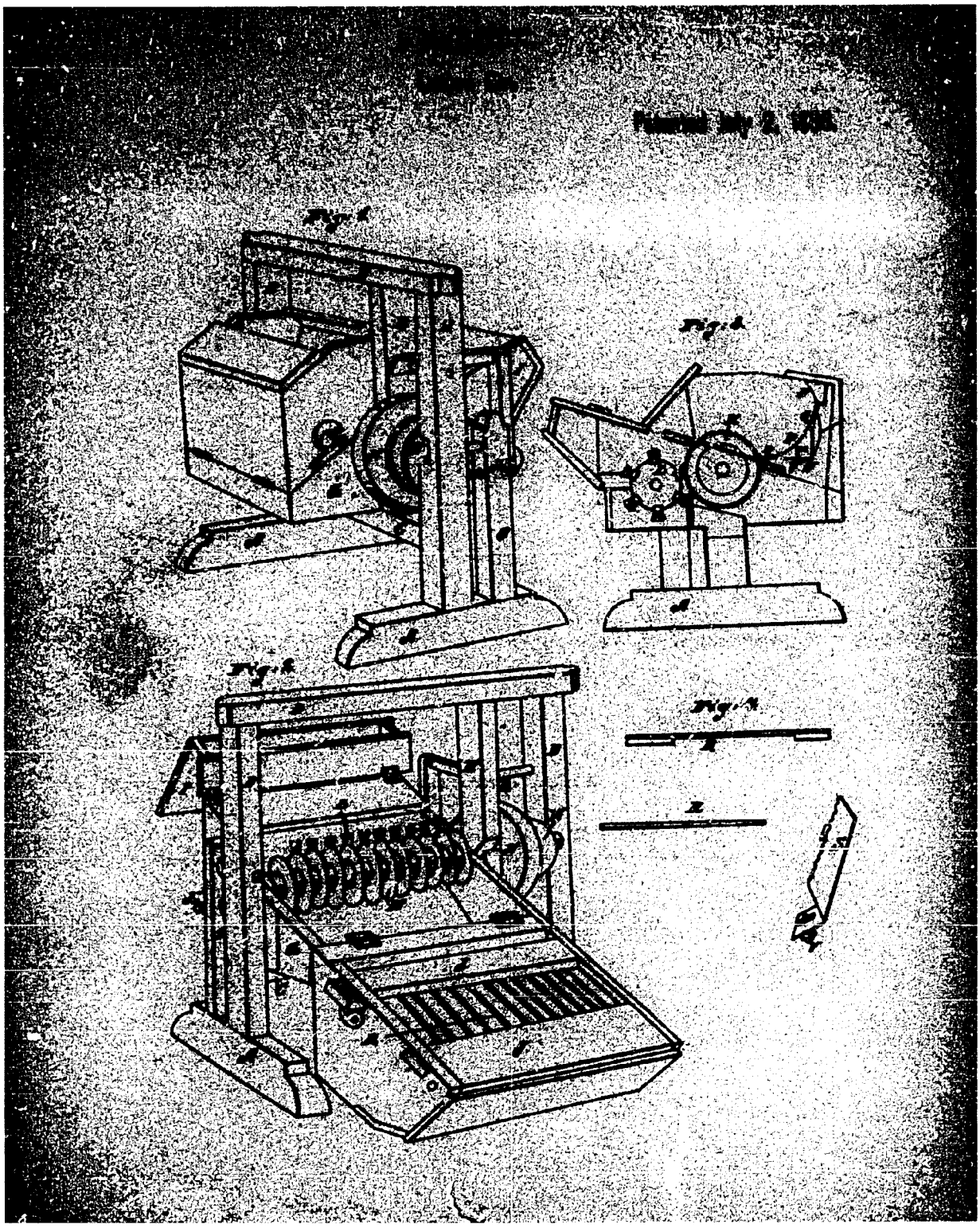

United States Patent
Patent No.: X9358